United States Patent Office 3,380,833
Patented Apr. 30, 1968

3,380,833
PROCESS FOR INACTIVATING FOOT-AND-MOUTH
VIRUS IN MEAT INFECTED THEREWITH
Earl W. Turner, Park Forest, Ill., assignor to International Packers Limited, Chicago, Ill., a corporation of Delaware
No Drawing. Filed May 14, 1964, Ser. No. 367,560
5 Claims. (Cl. 99—159)

This invention relates to a process for inactivating foot-and-mouth virus, and more particularly to preparing edible food products from meat infected by foot-and-mouth virus.

The importation of beef from some Latin American countries into the United States is restricted at the present time due to the presence of foot-and-mouth disease there. The ultimate solution to this problem is to eradicate foot-and-mouth disease from all infected areas and a long range program has been instituted to accomplish this purpose. During the interim period great benefits could be achieved by the developement of a method for the manufacture of cured beef which will assure inactivation of foot-and-mouth disease virus.

The effect of acid pH on inactivation of foot-and-mouth disease virus has been reported: Cottral et al., American Journal of Veterinary Research, vol. 21, No. 81, March 1960, pp. 288–297; Bachrach et al., Proceedings of the Society for Experimental Biology and Medicine, 95, (1957) pp. 147–152; Henderson et al., Journal of Hygiene 46 (1948) pp. 394–402. Bachrach et al. reported foot-and-mouth disease virus is totally destroyed in a few seconds at pH 2 to pH 4 and at pH 5 to pH 6.0 (the pH of meat after rigor mortis) the infectivity of the virus was lost at a rate of 90% per second and 90% per minute respectively. Henderson et al. found the virus survived 24 hours in the muscle tissue of infected beef stored at 4° C., but was inactivated on the third day when the pH was 5.3. Cottral et al. reported that virus was not found in the muscle of infected beef by the time the ultimate pH had reached 5.5 after ripening for 72 hours.

While the virus is destroyed by an acid pH in muscle tissue brought about by the formation of lactic acid through anaerobic glycolysis, the lymph nodes and blood clots in large vessels do not develop the degree of acidity that is present in muscle tissue, and the virus can survive for considerable time. Cottral et al. found the virus survived as long as 50 days in cured lymph nodes (pH 6.4) from infected animals while the virus was destroyed in the muscle tissue (pH 5.5) after 72 hours.

The result of these studies demonstrate that curing the meat from infected animals is not sufficient to inactivate foot-and-mouth disease virus in lymphatic tissue, since the pH of this tissue is not sufficiently acid to destroy the virus.

It is a principal object of the present invention to provide a process for inactivating foot-and-mouth virus. It is a further object of the invention to provide a process for manufacturing food products from meat containing foot-and-mouth virus by which the virus is completely destroyed.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principles of the invention may be employed.

Although workers in this field have recognized that foot-and-mouth virus is destroyed by an acid pH brought about by the formation of lactic acid during anaerobic glycolysis, a commercial process has not been established due to several problems. While the lactic acid is present in some tissues, it is not present in others in sufficient amounts to destroy the virus. The degree of acidity varies between various carcasses and also between tissues. It has been discovered that the necessary acidity to destroy the virus may be accomplished by the process of the present invention.

Briefly stated, the present invention is directed to the process for inactivating foot-and-mouth virus by the steps of comminuting meat infected with the virus to obtain intimate contact between the muscle and lymphatic tissues, introducing salt, such as sodium chloride, to aid in establishing a uniform pH throughout the macerated tissues by osmotic effects, and adding non-toxic edible acid to the cured ground beef to obtain acid pH conditions throughout the tissue.

The meat used in the process may be frozen, cured, ground beef and the like. The meat is comminuted according to well known procedures.

The virus is usually found only in the lymphatic tissues. It is, therefore, important to macerate the lymphatic glands to insure uniform acidification of this tissue.

In most cases, the meat particle size will be usually not larger than one inch, and preferably about one-half inch.

Salt, such as sodium chloride, is added to the meat to equalize the pH. It should be understood that a variety of curing salts may be employed for this purpose. The salt is intimately mixed with the tissue to obtain a generally uniform pH throughout the muscle and lymphatic tissues.

After the salt is thoroughly mixed throughout the macerated tissue, the mixture is preferably held for a period of time to insure equilibrium of a uniform pH throughout the tissue. It has been found that holding the mixture for at least one hour at temperatures adjacent freezing is desirable. Generally, a holding period from about 5 to about 10 hours above and adjacent the freezing point will be desirable. For example, holding the mixture at 8 hours above freezing at about 32° F. has been found satisfactory.

A nontoxic, edible acid that does not destroy the tissues is introduced into the meat in sufficient amounts to reduce the pH below about 6.0. It should be understood that a variety of acids may be employed, for example, hydrochloric, acetic, citric or lactic acid. Special preference is given to citric and lactic acids.

The amount of acid introduced must be sufficient to lower the pH to a value less than about 6.0 and may be to a value equal to that found in cured beef, or lower. The lower end of the pH range will be determined by practical limits, for example, very low pH will destroy the binding quality of the meat for use in the manufacture of sausage and canned meat products. Generally the pH range will be from about 6.0 to about 2.5, depending on the product.

Citric acid, for example, may be added in amounts of at least 0.01 percent by weight of the cured ground beef. A pH of 5.5 can be obtained by adding citric acid in amounts of 0.1 percent. Citric acid in amounts greater than 0.4 percent usually will be unnecessary.

The amount of acid to be added depends upon the original pH of the meat. For example, if the meat pH is below 6.0, very little, if any, added acid is necessary.

If hydrochloric acid is used the product should be partly neutralized with a base, such as sodium carbonate or sodium hydroxide.

While not desired to be limited thereby, applicant submits the following example to further illustrate the invention.

EXAMPLE A

Canner cows, fat to very lean, were used for these experiments. The animals were slaughtered, the carcasses washed with filtered chlorinated potable water, and then held in a beef cooler for a minimum of 72 hours to permit the meat to reach its ultimate pH and a temperature of 32° to 35° F. before boning and trimming. Bacteria counts were obtained from the surface of each carcass, using the procedures described under microbiological methods, before boning and trimming the meat.

Boning and trimming tables, knives, meat trucks, grinder, mixer, etc. were thoroughly washed and sanitized with sodium hypochlorite solution before use, and workers handling the meat were required to wash their hands in a sanitizing solution and wear clean clothing. The meat was boned and full carcass trimmings were used with the exception of the inside and outside rounds and the shank meat which were removed for use in other products. The meat was trimmed free of excess intermuscular fat and large pieces of connective tissues.

The trimmed meat was ground through a ½ inch, ¼ inch plate, or smaller plate, using a clean, chilled Enterprise Hasher. The meat was then weighed and transferred to a stainless steel mixer capacity 600 lbs. The meat was cured by mixing for five minutes with the addition of 3½ lbs. of sodium chloride and ¼ ounce sodium nitrite and ¼ ounce sodium nitrate dissolved in 500 ml. of water per each 100 lbs. of meat. The temperature of the meat before grinding was 32° F. to 35° F.—after grinding 36° F. to 40° F. and after curing 48° F. to 52° F.

After curing, the meat was packaged in 60 lb. capacity polyethylene bags and placed in a meat cooler at 32° F. to age for 8 hours before placing in the freezer. After holding for 8 hours, the bags were turned over to permit the diffusion of any small amount of meat juice which may have accumulated on the bottom of the bag and placed into 60 lb. capacity fiber board cartons. The cartons were placed on coils in a 0° F. freezer where it took a minimum of 18 to 24 hours to freeze the meat.

Experiments were also carried out using citric acid to lower the pH of the meat and in these experiments, the citric acid was added in an aqueous solution, 500 ml. per each 100 lbs. of meat after the other curing ingredients had been added and thoroughly mixed with the meat.

The frozen, ground, cured beef was tested for use in the manufacture of canned frankfurter sausages using the following formula:

| Ingredients | Standard Formula | Test using Frozen Cured Ground Beef [1] |
|---|---|---|
| Beef trimmings, 90% lean (kg.) | 37.5 | 28.0 |
| Frozen cured ground beef (kg.) | | 9.5 |
| Beef brisket fat (kg.) | 12.5 | 12.5 |
| Salt (kg.) | 1.75 | 1.4 |
| Ice (kg.) | 16.0 | 16.0 |
| Sugar (kg.) | 0.5 | 0.5 |
| Corn starch (kg.) | 1.5 | 1.5 |
| Sodium nitrate (kg.) | 4.0 | 4.0 |
| Sodium nitrate (g.) | 1.0 | 1.0 |
| Garlic (g.) | 37.5 | 37.5 |
| Nutmeg (g.) | 15.0 | 15.0 |
| Coriander (g.) | 100 | 100 |
| White pepper (g.) | 112.5 | 112.5 |

[1] 25% beef formula.

The frozen block of meat was chopped in a frozen meat cutter then ground through a ½ inch plate without defrosting the meat. This frozen cured meat was used to replace 25% of the beef trimmings used in the regular formula. Canned frankfurters made using the frozen cured ground beef were equal to the control (made using all fresh beef trimmings) in texture and flavor.

*pH measurements.*—The pH of the meat was determined 1 hour after curing, after holding the cured meat for 8 hours at 32° F. and after thawing the frozen cured meat. The pH was determined on samples of dissected portions of muscle, connective tissue and fat. A representative sample of 100 grams was taken for each individual pH measurement. The 100 gram sample was thoroughly mixed and a 5 gram aliquot taken and macerated with 10 ml. of glass distilled water in a March-Snow apparatus. The pH values were determined using a glass-calomel reference electrode with the pH meter calibrated using standard buffer solutions and adjusted for temperature.

*Addition of citric acid to meat.*—A buffering curve was established to determine the effect of citric acid on the pH of cured beef by adding 0.1; 0.2; 0.4; 0.8; and 1.2 percent citric acid to ground cured beef and measuring the pH of the meat after 2, 5, and 8 hours at 32° F. and after freezing and thawing.

*Microbiological analysis.*—The beef used for these experiments was analyzed for total bacteriological plate count using a representative sample of 11 grams prepared in the following dilutions: 0.1; 0.01; 0.001; and 0.0001. Difco nutrient Agar was used as the culture media and the inoculated petri dishes were incubated for 48 hours at 37° C.

Samples for determining the surface contamination of the carcasses were taken in two ways: (a) a surface "swab" method to determine the bacteria per square inch of surface area; and (b) by taking 60 pieces 0.5 gram each from each half carcass and homogenizing this sample to determine the total plate count per gram.

Samples were also taken of the meat after boning, at intervals during grinding, after curing and mixing, after holding the cured meat for 8 hours in a cooler at 30°–32° F. and on samples of the thawed cured frozen ground beef.

*Chemical analysis.*—Representative samples of frozen, cured ground beef were analyzed for moisture, fat, protein, sodium chloride, sodium nitrite, and sodium nitrate by standard laboratory procedures.

Frozen cured ground beef from Test No. 3 manufactured, was used without thawing. The frozen block was chopped and ground through a ½ inch plate. The sausage was chopped, stuffed into natural casings, smoked and canned in 450 gram cans.

*pH of frozen cured ground beef.*—The pH of ground meat 1 hour after curing, after holding the cured meat for 8 hours in a cooler at 30° to 32° F. and after freezing and thawing are shown in Table No. 1.

These measurements indicate there is very little difference between the pH of the muscle tissue, connective tissue, and fat when the meat is ground through a ½ inch plate or a ¼ inch plate—then mixed for 5 minutes in a regular meat mixer with the salt and other curing ingredients.

*Effect of citric acid on the pH of frozen cured ground beef.*—The pH buffer curve was obtained on the addition of different amounts of pure food grade citric acid to frozen cured ground beef. Results obtained on these experiments show that the addition of 0.1% citric acid to cured ground beef will adjust the pH of the tissue to approximately pH 5.50 which would be adequate for inactivation of foot-and-mouth disease virus.

The results obtained on Test No. 5 and Test No. 6 carried out in which 0.1% citric acid was added to meat having an initial pH of 5.85 to 5.9 are shown in Table No. 1. The final pH of the thawed frozen sample of cured ground beef was 5.50.

TABLE NO. 1.—pH MEASUREMENTS ON FROZEN CURED GROUND BEEF

| Test No. | Meat Ground Through | pH 1 hour after curing | | | | pH 8 Hours After Curing and Before Freezing | | | | Number of Days Frozen | After Thawing |
| --- | --- | --- | --- | --- | --- | --- | --- | --- | --- | --- | --- |
| | | M | CT | F | Whole Meat Sample | M | CT | F | Whole Meat Sample | | |
| 1 | ½″ plate | 5.3 to 5.6 | 5.5 to 5.55 | 5.45 to 5.5 | | 5.65 to 5.8 | 5.8 to 5.9 | 5.8 to 5.9 | | 13 | 5.61 |
| 2 | ¼″ plate | 5.4 to 5.45 | 5.5 | 5.5 | | 5.8 to 5.85 | 5.85 to 5.9 | 5.8 to 6.0 | | 13 | 5.55 |
| 3 | ½″ plate | 5.7 to 5.9 | 5.8 | | | 5.5 to 5.6 | 5.45 to 5.8 | | | 12 | 5.93 |
| 4 | ¼″ plate | 5.75 to 5.8 | 5.8 to 5.9 | | | 5.5 to 5.7 | 5.45 to 5.8 | | | 12 | 5.90 |
| 5 | ½″ plate | | | | 5.85 to 5.9 | | | | 5.75 to 5.8 | 7 | 5.67 |
| 6 | ½″ plate | 0.1% Citric Acid Added to the Cured Meat | | | 5.65 | | | | 5.5 to 5.6 | 7 | 5.5 |

NOTE.—Due to the very low fat content of the meat used in tests 3 through 6, it was not possible to determine the pH of this fraction. Tests 5 and 6, it was decided to dispense with trying to isolate this tissue because there was so little present and the connective tissue was found to be the same as the muscle tissue.

M=Muscle Tissue. CT=Connective Tisue. F=Fat.

*Microbiology of frozen cured ground beef.*—Total bacterial plate counts obtained on samples taken during different steps in the manufacture of six production size lots (600 lbs. each) of frozen cured ground beef and on the finished product are shown in Table No. 2. The results of these tests show that the bacterial counts on the finished product will be within very acceptable limits if proper sanitary controls are maintained throughout the manufacturing operations. The bacterial analysis on the finished product was obtained from frozen samples which were cut on a frozen meat cutter—then ground through a ½ inch plate while still in the frozen state. If the product was to be abused by defrosting at high temperature or held too long at room temperature before use, it would present the same problem as any other ground meat product held under these conditions.

*Chemical analysis of frozen, cured ground beef.*—Results of chemical analysis obtained on six production lots of frozen, cured, ground beef for moisture, fat protein, sodium chloride, sodium nitrite and sodium nitrate are shown in Table No. 3. All the analyses fall within acceptable limits of cured meat for use in the manufacture of sausage and canned meat product.

area of Argentina were inoculated with one milliliter of $10^7$ mouse ID 50 of type A foot-and-mouth disease virus on the epithelium of the tongue. After 48 hours the animals showed all the normal clinical symptoms of Aftosa. They were then slaughtered and the superficial lymph nodes collected. The nodes were held at −20° C. in sealed aluminum containers (freezing does not inactivate foot-and-mouth disease virus). The mandibular and prescapular lymph nodes were used for these tests.

Grinding, curing, and acid treatment

*Tests.*—Forty grams of infected lymph nodes were passed through a hand operated meat grinder and after grinding the following chemicals were added:

1.4 grams sodium chloride
0.44 ml. of a solution containing 14 grams of sodium nitrate and 14 grams of sodium nitrite per liter
1.50 ml. of 5% citric acid solution (equivalent to 0.17% citric acid in the final cured tissue)

The test mixture was divided into two parts, II which was held 24 hours at 4° C. and then 24 hours at −20° C. before it was prepared for injection into the test

TABLE NO. 2.—BACTERIOLOGICAL ANALYSIS OF FROZEN, CURED, GROUND BEEF

| Test No. | Meat Ground Through | Carcass Swab Bact., sq. in. | Bacteria on Surface per gr. | Trimmed Beef Bact., gr. | Ground Beef, gr. | One Hour After Curing | 8 Hours After Curing Before Freezing | No. of Days Frozen | Bact., gr., After Thawing |
| --- | --- | --- | --- | --- | --- | --- | --- | --- | --- |
| 1 | ½″ plate | 101,000 | 315,000 | 61,000 | 176,000 | 680,000 | 75,000 | 13 | 30,000 |
| 2 | ¼″ plate | Same carcasses as #1 | | | 54,000 | 56,000 | 57,000 | 13 | 45,000 |
| 3 | ½″ plate | 3,400 | 1,330,000 | 133,000 | 460,000 | 680,000 | 88,000 | 12 | 42,000 |
| 4 | ¼″ plate | Same carcasses as #3 | | | 1,600,000 | 1,400,000 | 65,000 | 12 | 43,000 |
| 5 | ½″ plate | 20,000 | 59,000 | 180,000 | 380,000 | 110,000 | 154,000 | 7 | 41,000 |
| 6 | ½″ plate | Same carcasses as #5 but 0.1% citric acid added in curing | | | 300,000 | 200,000 | 133,000 | 7 | 52,000 |

NOTE.—The figures given for bacteria count per square inch of the carcass surface by the "swab" method are average values obtained on individual determinations for each test. The values given for meat held 8 hours after curing, before freezing are averages obtained on the analysis of samples taken from 5 or 6 individual 60 lb. polyethylene bags on each test. All other values given above are the results obtained on aliquots of pooled samples.

TABLE NO. 3.—CHEMICAL ANALYSIS OF FROZEN CURED GROUND BEEF

| Test No. | Meat Ground through | Moisture, Percent | Fat, Percent | Protein, Percent | Sodium Chloride, Percent | Sodium Nitrite, p.p.m. | Sodium Nitrate, p.p.m. |
| --- | --- | --- | --- | --- | --- | --- | --- |
| 1 | ½″ plate | 72.9 | 3.7 | 20.1 | 3.03 | 60 | 150 |
| 2 | ¼″ plate | 73.4 | 3.8 | 19.2 | 3.45 | 60 | 150 |
| 3 | ½″ plate | 76.6 | 0.8 | 19.2 | 3.33 | 70 | 180 |
| 4 | ¼″ plate | 75.6 | 2.0 | 19.2 | 3.15 | 60 | 200 |
| 5 | ½″ plate | 76.6 | 0.9 | 19.0 | 3.36 | 60 | 140 |
| 6 | ½″ plate | 75.3 | 0.8 | 20.4 | 3.36 | 60 | 140 |

EXAMPLE B

These studies were carried out using lymph nodes from beef cattle infected with foot-and-mouth disease virus rather than with the meat itself because the normal pH of cured beef is below pH 6.0 and therefore low enough to inactivate foot-and-mouth disease virus without the addition of citric acid whereas the normal pH of lymphatic tissue is above pH 6.0 and therefore the virus remains active in this tissue. Suckling mice (suckling animals—calves, sheep, mice, etc. are susceptible to foot-and-mouth disease virus and the virus is fatal at this stage of the animals' growth) and susceptible non-vaccinated beef animals were used to test the effectiveness of treatment with citric acid.

*Preparation of infected lymph nodes for the test.*—Non-vaccinated Aftosa free cattle from the Patagonian animals; and portion I which was prepared immediately for injection without the storage period.

*Control.*—Forty grams of infected lymph nodes were ground and held under refrigeration with no treatment.

Results of earlier experiments demonstrated that it was not necessary to include a control using lymph nodes from uninfected non-vaccinated animals because there was no mortality or clinical signs of Aftosa using this tissue.

*Preparation of the lymphatic glands for injection.*—Suspensions of the lymphatic glands for injection into the test animals were prepared by homogenizing the tissue in a Waring Blendor using 20 grams of lymphatic tissue with 40 ml. of physiological buffered saline pH 7.5. The suspensions were filtered through sterile cotton.

Test A

Test solution I of the test suspension was injected immediately into 60 suckling mice.

Test solution II (from test glands which were held 24 hours at 4° C. and then 24 hours at −20° C. after mixing with citric acid and the curing salts). This suspension was injected into 144 suckling mice.

*Control.*—The control suspension prepared using untreated infected lymphatic glands was prepared the same as Test solution II. The sample of infected untreated glands (Control) was titrated for the purpose of determining the LD 50. This was done by suspending the ground nodular tissue in an amount of sterile distilled water in order to prepare a 1:10 suspension. This was designated 10° dilution. Three successive dilutions were made of this on a 1 to 10 basis. Thus four suspensions result $10°$, $10^1$, $10^2$, and $10^3$ respectively. 0.05 ml. of these four dilutions were injected into each of six mice per dilution. It should be noted that 10° is really a 1:10 dilution; this means that in 1 ml. there is $\frac{1}{10}$ of the infective dose of the original sample. Furthermore if only 0.05 ml. are injected in one mouse the infective dose present will be $\frac{1}{20}$ of the dilution, or $\frac{1}{200}$ of the original sample. Being $\log_{10} 200 = 2.3$, the effect of the injection will be equivalent to the injection of 1 ml. of a $10^{2.3}$ dilution of the sample, therefore for calculations the dilutions have to be taken as $10^{2.3}$, $10^{3.3}$, $10^{4.3}$, and $10^{5.3}$ respectively.

Results

The addition of citric acid depressed the pH of the ground lymph nodes from 6.90 to 5.80. Based on previous findings the distribution of citric acid was assumed to be uniform and pH measurements were made only on duplicate.

TABLE 4.—pH VALUES OF THE MIXTURES AFTER STORAGE

| Batch: | Average pH |
|---|---|
| Test (cured pH adjusted) | 5.80 |
| Control (no treatment) | 6.90 |

Table 5 contains the observations of mortality after 5 days' injection. No deaths occurred in the 144 mice injected with the Test suspension which has been treated in standard manner or in those mice injected with the suspensions prepared immediately after curing. For the suspension without storage six suckling mice are not considered because the mother died on the second day. Thus 54 mice are included in the calculations.

It should be noted that the suspensions used for injection of the Test batch are 1:1 dilutions, therefore more concentrated than the 10° dilution for the Control (1:10 or most virulent). For this dilution 4 out of 6 mice injected with the control suspension died, thus the mortality is 67%.

TABLE 5.—TOTAL MORTALITY AFTER 5 DAYS IN INOCULATED MICE

| Number of mice | Test just after curing | Test after storage | Control 10° dilution |
|---|---|---|---|
| Dead | 0 | 0 | 4 |
| Alive | 54 | 144 | 2 |
| Total | 54 | 144 | 6 |
| Mortality rate | 0 | 0 | 67 |

Since no deaths occurred in the mice injected with unstored treated Test, or stored Test suspensions no mortality table has been prepared. Table 6 contains the daily records for the dilutions in the Control batch and the calculations of the titre of virus contamination of the nodes.

TABLE 6.—TITRATION OF INSPECTED NODES CHART CHART SHOWING DAILY RECORDS OF LIVING MICE

| Dilution | Days after inoculation | | | | | |
|---|---|---|---|---|---|---|
| | 1 | 2 | 3 | 4 | 5 | 6 |
| $10^0$ | 6 | 4 | 2 | 2 | 2 | 2 |
| $10^1$ | 6 | 6 | 5 | 5 | 5 | 5 |
| $10^2$ | 6 | 6 | 6 | 6 | 6 | 6 |
| $10^3$ | 6 | 6 | 6 | 6 | 6 | 6 |

| Dilution | Positive | Negative |
|---|---|---|
| $10^0$ | 4 | 2 |
| $10^1$ | 1 | 5 |
| $10^2$ | 0 | 6 |

The dilution necessary to produce a 50% mortality (3 positive—3 negative) is calculated interpolating between dilutions $10^0$ and $10^1$. The result is $10^{0.3}$ and considering the first dilution $10^{2.3}$ the LD 50 is $10^{2.6}$. The titre 2.6 means that there are about 1000 infective doses per gram of material. This titre is not high but it is enough to produce a very high mortality in the conditions of injection.

DISCUSSION

This experiment confirmed the findings of previous experiments and demonstrates unequivocally the possibility to completely destroy the virus of foot-and-mouth disease in lymphatic nodes by adjusting the pH to a level of 5.80. The importance of this accomplishment is all the greater when it is viewed with the realization that the pH of lymphatic tissue is one of the most difficult to maneuver because of its high intrinsic buffer capacity.

A second observation is that the effectiveness of the acid pH adjustment technique is immediate and not time temperature dependent.

Test B

Samples for virus testing were prepared in accordance with the same technique used for previous experiments.

The two samples were designated Test (infected glands pH adjusted) and Control (infected glands untreated). The samples were held 24 hours at cooling conditions and frozen 24 hours.

After storage the samples were analyzed for pH and thawed. 40 grams of each sample were suspended in 200 ml. of PBS (phosphate buffer saline) in a Waring Blandor and the suspension filtered through sterile cotton.

The filtrate corresponding to the Test sample was inoculated into 60 suckling mice in the usual way reported previously and into 6 cattle (2 ml. of the suspension were inoculated in the tongue and 9 ml. in the axilla of the front left leg). The filtrate corresponding to the Control was inoculated into 60 suckling mice and into 3 cattle using the same technique.

The suckling mice were kept in 20 separate boxes each one containing 6 injected mice and one non-injected mother. Mortality was recorded daily. The injected cattle were kept in 9 separate stalls each one containing a non-injected animal as room test. The cattle were inspected daily.

RESULTS

The addition of citric acid lowered the pH of the ground lymph nodes from 6.70 to 5.75.

TABLE 7.—pH VALUES OF THE MIXTURES AFTER STORAGE

| Batch: | pH |
|---|---|
| Test (cured pH adjusted) | 5.75 |
| Control (no treatment) | 6.70 |

Table 5 contains the observations of mortality after 5 days' injection. No deaths occurred in the 60 mice injected with the pH adjusted sample.

TABLE 8.—TOTAL MORTALITY AFTER 5 DAYS IN INOCULATED MICE

| Number of mice | Test | Control |
|---|---|---|
| Dead | 0 | 59 |
| Alive | 60 | 1 |
| Total | 60 | 60 |
| Mortality, percent | 0 | 98 |

48 hours after injection two cattle injected with the Control sample presented signs of FMD infection and after 5 days the three injected with this sample and the three non-injected animals kept as room test presented definite signs of the disease. The paired animal which had not been intentionally infected picked up the disease from its infected stallmate. No signs of the disease were found in the 6 animals injected with the Test sample nor in the 6 cattle kept as stall control for these.

DISCUSSION

Results of the injection to suckling mice confirms the conclusions of previous experiments. No deaths occurred in the 60 mice injected in this test. Pooling the results of the last three experiments demonstrates that no deaths occurred in 348 suckling mice injected with the infected ground nodes after curing and adjusting of pH. The injection in cattle, the animal that is the most sensitive as laboratory assay, demonstrates that the virus of foot-and-mouth disease is completely destroyed in the lymph nodes when treated as described.

Other modes of applying the principle of the invention may be employed, change being made as regards the details described, provided the features stated in any of the following claims or the equivalent of such be employed.

I, therefore, particularly point out and distinctly claim as my invention:

1. In the process for inactivating foot-and-mouth virus, the steps which comprise comminuting meat infected with foot-and-mouth virus for obtaining intimate contact between the muscle and lymphatic tissues, adding at least one curing salt in amounts sufficient and holding for a sufficient time above freezing temperatures to obtain a generally uniform pH throughout the comminuted meat, introducing at least one nontoxic acid in sufficient amounts to reduce the pH of the lymphatic tissue in the comminuted meat to a value in a range from 2.5 to 6.0, and maintaining the lymphatic tissue in the comminuted meat at a pH in a range from 2.5 to 6.0 for a length of time sufficient to destroy said virus.

2. The process of claim 1 in which the acid is citric.
3. The process of claim 1 in which the acid is lactic.
4. The process of claim 1 in which the acid is acetic.
5. The process of claim 1 in which the acid is hydrochloric, and further characterized by treatment with a base to at least partly neutralize the final product.

References Cited

UNITED STATES PATENTS

| 2,788,278 | 4/1957 | Zimont et al. | 99—159 |
| 2,797,998 | 7/1957 | Praizler | 99—159 |
| 3,069,272 | 12/1962 | Harper | 99—159 |
| 3,099,566 | 7/1963 | Flesch et al. | 99—159 |
| 3,240,612 | 3/1966 | Wolnak | 99—159 |

FOREIGN PATENTS 598,377  5/1960  Canada.

OTHER REFERENCES

Hutyra et al.: "Special Pathology and Therapeutics of the Diseases of Domestic Animals," 1938, vol. 1, published by Alexander Eger, Chicago, p. 422.

HYMAN LORD, *Primary Examiner.*

A. LOUIS MONACELL, *Examiner.*